Figure 1:
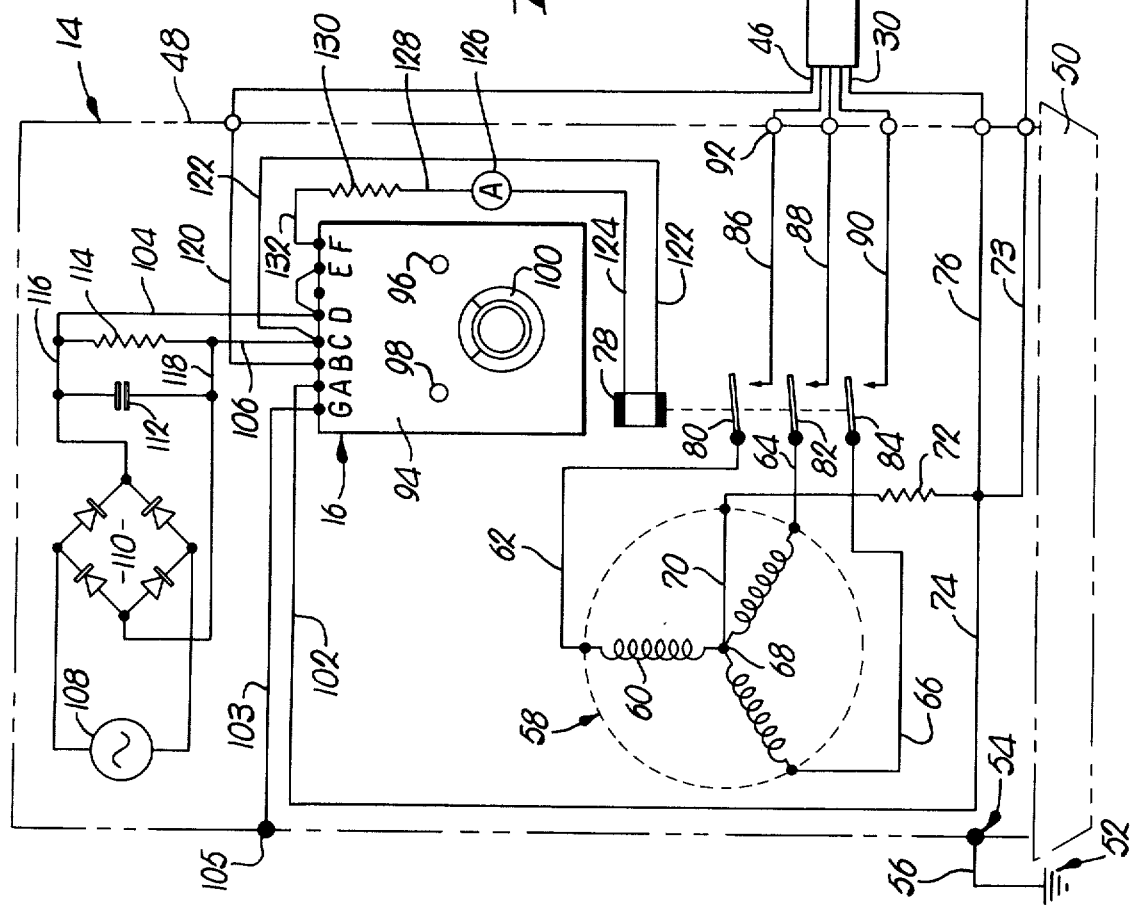

United States Patent

Vasudevan et al.

[11] 3,934,176
[45] Jan. 20, 1976

[54] SAFETY APPARATUS FOR ASSURING PROPER GROUNDING OF MINING MACHINERY OR THE LIKE

[75] Inventors: Karappurath Vasudevan, Pittsburgh, Kans.; David J. Sloop, St. Ann, Mo.

[73] Assignee: Atkinson Armature Works Co., Inc., Pittsburg, Kans.

[22] Filed: Oct. 16, 1974

[21] Appl. No.: 515,168

[52] U.S. Cl............... 317/18 C; 317/18 B; 324/62; 324/DIG. 1; 340/255
[51] Int. Cl.² ........................................ H02H 3/16
[58] Field of Search .... 317/18 R, 18 B, 18 C, 18 D; 324/62, 63, DIG. 1; 328/147; 340/255, 256

[56] References Cited
UNITED STATES PATENTS

| | | | |
|---|---|---|---|
| 3,150,315 | 9/1964 | Simon | 324/DIG. 1 |
| 3,335,324 | 8/1967 | Buckeridge | 317/18 D |
| 3,343,154 | 9/1967 | Seesselberg | 340/255 |
| 3,633,098 | 1/1972 | Westlund | 324/62 R |
| 3,728,582 | 4/1973 | Agnew | 317/18 C |
| 3,764,853 | 10/1973 | Beachley, Jr. | 317/18 D |
| 3,794,884 | 2/1974 | Sircom | 317/18 D |

*Primary Examiner*—J. D. Miller
*Assistant Examiner*—Harry E. Moose, Jr.
*Attorney, Agent, or Firm*—Schmidt, Johnson, Hovey & Williams

[57] ABSTRACT

Safety control apparatus of substantially improved reliability and sensitivity is provided for detecting faults and automatically deenergizing electrically powered mobile or portable equipment, such as mining machinery, which is energized in the field by means of relatively long cables often carrying high voltage electrical power from a sub-station, in the event of either a short circuit between a sensing conductor and ground or any failure of the ground connection included in the system to protect the operators of the equipment and the equipment itself. The improved safety apparatus is further characterized by its ability to respond to detected faults so quickly as to virtually eliminate any chance for operator injury or damage to equipment, even when very high voltage power is being used. Although the apparatus responds to both ground interruption (or high resistance to ground) and the mentioned type of short faults in a highly sensitive manner, it is essentially immune to the effects of induced transients such as have plagued the reliability of prior safety systems for the same general purpose.

5 Claims, 2 Drawing Figures

SAFETY APPARATUS FOR ASSURING PROPER GROUNDING OF MINING MACHINERY OR THE LIKE

This invention relates to the field of safety apparatus for electrical equipment and, more particularly, to safety control apparatus for use in connection with systems of electrically powered machinery employed under field conditions, such as in mining operations.

Broadly, the apparatus of the invention is concerned with the detection of electrical faults affecting the safety of personnel, equipment or both and the electrical deenergization of the system in response to the detection of such faults. The apparatus detects faults of both the type involving the occurrence of certain electrical shorts and the type involving an absence or interruption or a high-resistance coupling of the grounding of individual units of machinery required for safety purposes.

A typical example of one of the primary areas of application for the apparatus of the invention is in systems of electrical machinery used in the surface or so-called "strip" mining of coal. Such systems commonly employ various types of relatively movable functional units interconnected by relatively long electrical cables. One of the units of such systems will normally be what is usually called a power sub-station unit, which serves as a source of high voltage electrical power to be distributed to the other units via cabling. The other units will typically be large electrically powered shovels or other machines for excavating or otherwise handling either the material being mined or material which must be moved to expose the material to be mined. The latter type material working units must be moved as the work requires and are often physically separated from the power sub-station unit by distances of several hundred feet, so that the electrical cabling interconnecting the units may be relatively long and is generally just laid along any paths that may be temporarily convenient over the surface of the terrain, where it is exposed both to the elements and to the possiblity of being run over, cut, broken or damaged by trucks or other equipment operating in the area.

From the electrical standpoint, such systems commonly employ at the power sub-station unit a power transformer adapted to be energized from either an associated field generator or any other available primary power source and having a three-phase output winding for supplying the operating power required by the electrical motors of the working units via the mentioned interconnecting cabling. The cables heretofore used for interconnecting the units normally employed four conductors, of which three were for carrying the three-phase power and the fourth was a grounding conductor. Since the movable nature of the working units precludes convenient and reliable local grounding of the metal frames and parts thereof, as well as the fact that such units are often mounted on wooden "sleds" or other ground engaging assemblies not providing any effective "direct grounding" of the frames thereof, it is customary and a matter of practical necessity in such systems to provide local grounding only at the sub-station unit and to couple such sub-station ground with the frames of the other units for safety purposes through the mentioned fourth conductor of the cabling.

In such systems, the center of the "Y" of the output winding of the transformer at the sub-station unit has also been coupled through a resistance to the local ground with the intention of limiting the fault condition operating current of the three-phase power being distributed to the working units to some value (typically 25 Amperes) for minimizing the electrical shock hazard in the event of certain types of faults involving shorting of a power conductor. In addition, the three-phase output line was heretofore provided at the sub-station unit with an automatic circuit breaker for interrupting the power distribution connection between the transformer output winding and the cabling to the working units in response to the sensing of any overload above the normal operating current, such as might arise from a short circuit occurring in a cable or one of the working units.

Such prior systems were deficient from the saftey standpoint, however, for a number of reasons. They did not provide any really reliable protection against an interruption of the ground coupling to a working unit, such as could occur from breaking of the grounding conductor of the cabling, an ineffective plug connection or the like, and such grounding failure faults often existed undetected. Even when prior attempts to sense such faults through employment of a pilot or sensing conductor in the cable with a terminating resistance at the remote unit were made, the effects of voltages induced in the pilot conductor from the power conductors prevented sufficient sensitivity being employed to obtain the quick response to faults needed for safety purposes, and although system deenergization might eventually be accomplished in response to the resulting overload, the time lag involved in sensing the fault was so relatively great that the damage was usually done before deenergization could be accomplished.

The gravity of the consequences of electrical faults in such systems, and particularly the great danger to operating personnel at the various units, has prompted the appropriate governmental agencies to seek and require increasingly better safety protection against the mentioned type of industrial hazard. Various methods of remedying the situation have been considered, including attempts to adapt electrical safety control apparatuses that have proved satisfactory in less demanding applications to the more stringent demands encountered in systems involving field installations of heavy, electrically operated equipment. In the latter regard, it is noted that field shovels used in strip mining operations typically require three-phase power of 480 to 23,000 volts distributed through cables of commonly 500 to 1,500 feet in length just laid along the top of the ground in all sorts of weather. Such prior attempts to solve the problem with means conventionally used in more moderate environments have, however, proved generally unsatisfactory and unreliable for the type of systems to which this invention is primarily directed, for a variety of reasons including the difficulty of achieving sufficient sensitivity and quickness of response with conventional techniques, without impairing stability through the tendency of conventional apparatus to respond to false fault sensings arising from the electrical transients that are common in lengthy cables operating at high potentials and currents into electrical loads that vary sharply even during normal operation.

Accordingly, it is the primary object of this invention to provide improved safety control apparatus for electrical systems operated under adverse conditions, which overcomes the disadvantages and limitations of apparatus previously proposed or used for such general purpose.

It is another important object of this invention to provide such improved safety control apparatus, which is extremely sensitive, quick acting and reliable in responding to faults of either the interruption of ground or excessive ground resistance types.

It is another important object of this invention to provide such apparatus, which, although employing relatively simple and straightforward electronic means for accomplishing the desired results, is nevertheless highly resistant to responding to false fault signals and conditions such as those generated in long cables operating at high potentials and terminated by sharply varying loads.

Still other important objects of this invention, including the employment of a fifth "pilot" or sensing conductor in the inter-unit cabling, the employment of a relatively low resistance, terminating connection between the pilot conductor and the grounding conductor at each working unit to provide a reference parameter to be sensed with respect to the condition of the cabling leading to each working unit, the employment of bridge type resistance sensing in the fault detection module, the utilization of a "window range" for the parameter being sensed by the detection module in order to provide fault detection upon sensing that the parameter has varied outside of the window range in either direction, and a number of other more specific constructional and functional features, will be made clear or become apparent to those skilled in the art from the drawings and the description hereunder of a preferred embodiment of the apparatus.

Figure 2:
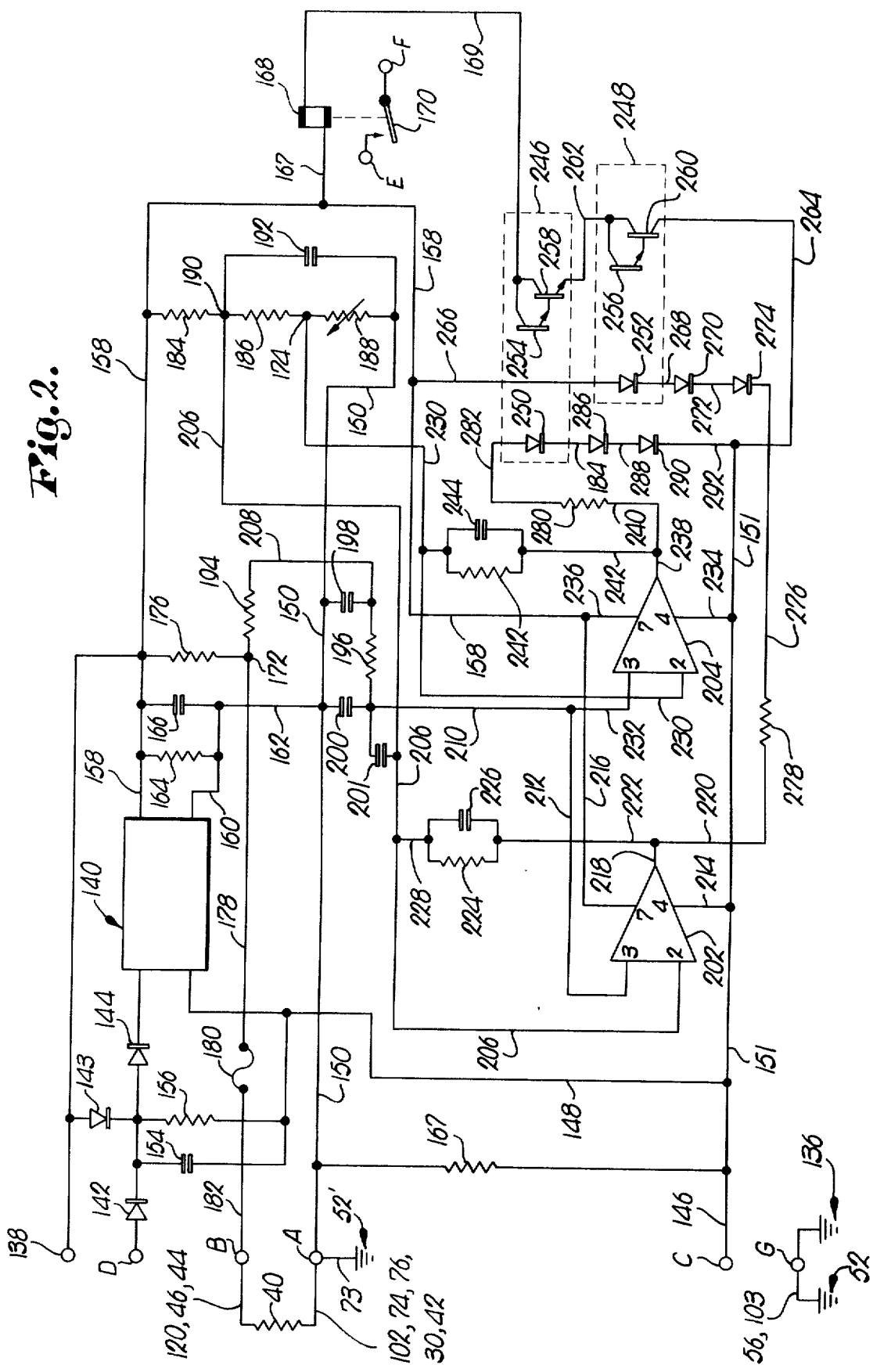

In the drawings:

FIG. 1 is a schematic representation of a simplified, illustrative system involving a single working unit requiring electrical power for operation thereof, a power sub-station unit for supplying electrical power to the working unit, and safety control apparatus in accordance with this invention and including an improved fault detecting module and cabling interconnecting the work unit with the sub-station unit and the fault detection module associated with the latter;

FIG. 2 is a circuit diagram of a preferred embodiment of the fault detecting module employed by the invention.

Referring initially to FIG. 1, the somewhat simplified system depicted to illustrate the manner in which the safety control apparatus of this invention is applied thereto broadly includes an electrically powered working unit 10 interconnected by electrical cable 12 with a power sub-station unit 14, with the latter of which it will be noted a fault detection module as contemplated by the invention is associated and generally identified by the reference numeral 16.

The working unit 10 (of which more than one may be employed, if desired) normally is in the nature of an electrically powered shovel or other piece of heavy materials handling machinery including some sort of metal frame and other metal machine structure, the details of which are not shown in the drawing, but which is indicated by the dotted outline 18. The frame and machine structure 18 are commonly mounted upon some sort of means 20 for rendering the unit 10 movable. The means 20 may be a wooden "sled", rubber tired wheels, caterpillar type tracks or the like, any of which serve either to electrically insulate the frame and machine structure 18 from the ground upon which the unit 10 is resting or, at least, to provide only an imperfect and unreliable electrical path between the frame and structure 18 and ground. As previously noted, and as well known to those skilled in the art, one of the requirements for safety protection in connection with such units 10 is that the frame and machine structure 18 be at all times effectively grounded in an electrical sense, for example, to prevent electrocution of an operator while mounting the frame 18 from the ground or vice versa in the event of some fault condition by which the metal frame 18 may have become charged with an electrical potential.

Mounted on the frame 18 of the working unit 10 is a three-phase electrical motor 22 suitably coupled mechanically with the machine structure of the unit by conventional means (not shown) for driving such machine structure during normal operation of the unit 10 in the field. Since such operation may commonly involve stopping and starting of the motor 22 or frequently varying the speed thereof in certain types of equipment, it will be clear that the motor 22 presents a highly variable load to the electrical source and connecting leads by which it is energized, thereby resulting in the creation of frequent electrical transients in the cable 12, which are of substantial magnitude by virtue of the high currents usually involved in powering heavy machinery such as typified by the unit 10. The motor is provided with three-phase input leads 24, 26 and 28, through which it receives normal energizing power from the corresponding conductors of the electrical cable means 12.

A fourth "grounding" conductor 30 of the cable means 12 is electrically coupled with the frame and machine structure 18 of the unit 10, as indicated by the solid colored dot 32 representing an electrical connection point (as contrasted with the open points such as 34 and 36 which merely represent possible terminals of a suitable plug and socket connector on the unit 10 for receiving and coupling with the conductors at the adjacent end of the cable means 12). The metallic housing frame of the motor 22 is also preferably connected by a line 38 with the electrical interconnection point 32 between the frame and machine structure 18 and the grounding conductor 30 of the cable 12.

The items thus far noted in connection with the working unit 10 and the cable 12 are generally conventional in virtually all systems of the type under consideration and, in particular, even the connection of a grounding conductor 30 of the cable leading to the unit 10 with the frame and machine structure 18 of the latter has been commonly employed in such systems in the past, with the vain hope that electrical grounding of the frame and machine structure 18 would be thereby accomplished. As previously observed, however, conventional prior "safety apparatus" for such systems, being functionally oriented to respond merely to overloads or other particular conditions affecting the power being supplied to the connecting cable, were insensitive to faults such as a break in the grounding conductor 30, a failure to effect proper electrical interconnection with the frame 18 as at 32 and the like, with the result that the unit 10 of prior system could continue operating with its motor fully energized, in which condition neither the operator nor the equipment was protected against the possible consequences of one of the power leads 24, 26 or 28 (or the cable conductors coupled therewith) becoming shorted to the frame or machine structure 18 until such time as a sufficient overload or other special conditions had developed in the power carrying lines themselves to actuate a circuit-breaker back at the sub-station unit 14. If the over-load or other condition, such as earth leakage, was insufficient to activate the circuit-breaker, operating personnel were subjected to a severe shock hazard.

In the unit 10 is provided what may be called a terminating resistance 40 of relatively low value (typically of the order of four ohms) coupled between the "grounding point" 32 on the frame 18 by means of a lead 42 and an opposite lead 44 coupled with a fifth "pilot" or sensing conductor 46 in the cable means 12.

The power sub-station unit 14 normally includes some sort of metal frame indicated by the dotted outline 48, in turn mounted for mobility upon means 50, which either tend to electrically insulate the frame 48 from ground or at least do not provide a reliable electrical ground therefor. Accordingly, an effective electrical ground 52 for the system is locally provided adjacent the unit 14 by any conventional means (such as a conductive grounding stake, not shown). The frame 48 of the unit 14 is coupled at a connection point represented by the solid dot 54 with the local ground 52 by a conductive lead 56, which is preferably protected in any suitable manner against being disturbed (because of the importance of maintaining such basic coupling between the system and the local ground 52).

The sub-station unit 14 is usually provided with a power transformer 58 having a three-phase output winding 60 adapted to deliver three-phase power of the desired voltage to three power output leads 62, 64 and 66. It will be understood that a primary winding (not shown) of the transformer 58 will conventionally be coupled with and energized by any available primary source of suitable alternating current power (not shown), such as a local generator associated with the unit 14 or a coupling with an electrical power line from a remote generating station. In a localized sense with respect to the field system under consideration, however, the transformer 58 and its output winding 60 may be regarded as representing the source of power to be distributed to the unit(s) 10 and over which the apparatus of the invention is intended to exert control for safety purposes.

It will be noted that the center 68 of the output winding 60 is coupled with a second local ground 52' through a lead 70, a limiting resistance 72, and lead 73 in conventional fashion for the purpose of limiting the possible fault current drawn from the winding 60 to some limit value (typically 25 Amperes in high voltage systems). Similarly, the grounding conductor 30 of the cable means 12 is conventionally coupled with the local ground 52' via leads 76 and 73. The local grounds 52 and 52' are separated by a distance specified by safety regulations to reduce voltage gradient effects during faults.

It may be helpful to observe that the portions of the sub-station unit 14 thus far described are all essentially conventional, in order that the novel portions thereof hereinafter described will be more readily recognized, both individually and in their relationships to each other and to the pilot conductor 46 of the cable means 12 and the reference resistance 40 associated with the working unit 10.

The improved unit 14 employs a quick-acting direct current circuit-breaker relay having an operating coil 78 and three heavy current switches 82, 84 and 86. The output leads 62, 64 and 66 are respectively coupled with the relay switches 82, 84 and 86, which are in turn oppositely coupled with leads 86, 88 and 90, to which the three power conductors of the cable 12 are connected through suitable connector plug means represented in the drawing by open-dot connection points as at 92. The switches 80, 82 and 84 are illustrated in the drawing in their normally open condition, which prevails when the operating coil 78 is deenergized. Thus, it will be understood that power can be supplied from the transformer 58 to the cable 12 only when the switches 80, 82 and 84 are closed by energization of the coil 78, which is one of the ways in which the apparatus protects against even internal faults of the control portion thereof (in this instance, for example, non-functioning of the detecting modile 16 due to a localized loss of power thereto or the like).

The fault detector module 16 located at the power substation unit 14 broadly includes a panel 94 provided with a pair of indicator lights 96 and 98, a calibrated control knob 100 and a number of connection terminals A, B, C, D, E, F and G, the functional significance of which parts will be hereinafter described. Before turning attention from FIG. 1 to the electrical details of the module 16 illustrated in FIG. 2, however, several further observations should be made. First, the terminal A of the module 16 is coupled by a lead 102 and the lead 56 to the local ground 52, in order to permit connection to the latter within the module 16 of the control circuitry hereinafter explained. Secondly, the direct current operating voltage required by the circuity of the module 16 is supplied to the latter through a positive lead 104 coupled with the terminal D and a negative lead 106 coupled with the terminal C. The voltage required for application to leads 104 and 106 may be derived from any suitable source, including batteries, but the preferred embodiment employs a local alternating current source 108 on the unit 14 (often derived from the main power source), a bridge rectifier generally designated 110 for rectifying the output of the source 108, and a conventional filter capacitor 112 and output resistance 114 coupled between the positive and negative output lines 116 and 118 of such power supply to which the leads 104 and 106 are respectively connected. Thirdly, it will be noted that the pilot conductor 46 of the cable 12 is coupled with the terminal B by lead 120. Fourthly, the terminal C, which is also connected with the negative power supply lead 106 is coupled by a lead 122 with one side of the operating coil 78, while the other side of the latter is coupled back to the terminal F through a lead 124, a current measuring meter 126 (typically 0–200 milliamperes), a lead 128, a current limiting resistance 130 (which typically limits the current that may flow to the operating coil 78 to about 150 milliamperes or less), and a lead 132. The module 16 may be provided with additional terminal points for convenience in making other connections not relevant to the invention or to facilitate distribution within the module 16 of a particular external signal or voltage.

Referring next to the circuitry of the preferred embodiment of the fault detection module 16 shown in FIG. 2, it should be most understandable to initially identify the primary components and their general functions and to then explain the overall operation of the circuitry in the context of the relationships between such components.

The terminals A, B, C, D, E, F and G are similarly identified in FIGS. 1 and 2, and it will be recalled that terminal A represents the connection point at the module 16 with the remote reference resistance 40 at the working unit 10 via leads 102, 74 and 76 of sub-station unit 14, grounding conductor 30 of cable 12, and lead 42 of working unit 10; terminal B represents the connection point at the module 16 with the remote reference resistance 40 via lead 102 of unit 14, pilot conductor 46 of cable 12, and lead 44 of unit 10; terminal C represents the point at which the negative lead 118 of the power supply for the module 16 is connected with the latter via lead 106 and with one side of the operating coil 78 via lead 122; terminal D represents the point at which positive lead 116 of the power supply for the module 16 is connected with the latter via lead 104 and with the terminal E via a jumper; terminal E is thus a second point of connection of the positive power supply voltage with the module 16 via the jumper from terminal D; terminal F is the point from which connection from the module 16 is made to the "controlled" side of the operating coil 78 via lead 132, current limiting resistance 130, lead 128, the meter 126 and lead 124 (See Fig. 1); and terminal G is coupled via lead 103 with a connection point 105 with the frame 48, the latter being in turn coupled with local ground 52 via connection point 54 and lead 56. In some installations, terminals A and G may, if desired, be jumpered together. The other terminal 138 shown in FIG. 2 merely presents a test point for external monitoring, when desired, of a regulated voltage employed by the circuitry.

An electronic voltage regulator 140 of any suitable type (a Model 7824 voltage regulator marketed by Fairchild Semiconductor Products Company is quite satisfactory) receives the voltage input from the external power supply of the unit 14 via the terminals D and C; the positive voltage from terminal D is coupled through a diode 142 and 144 with the regulator 140, while the negative side of the power supply voltage proceeds from the terminal C to the regulator 140 via leads 146 and 148. An input filtering capacitor 154 and bleeder resistance 156 are shunted across such voltage input for decreasing the effects of possible transients. The diodes 142, 143 and 144 provide protection from the regulator 140 in the event of possible external shorting of the terminals D and C or inadvertent reversal of the connections being made thereto from the external power supply for the module 16 or from voltage transients that might occur under certain conditions. The unregulated direct current voltage delivered to terminals D and C from the external power supply will preferably be of level so as to provide a regulated output between the positive and negative output leads 158 and 160 of the regulator 140 of about 24 volts direct current, it being noted that the negative regulated voltage output lead is grounded to lead 150 via the lead 162. An output bleeder resistance 164 and a further filter capacitor 166 are shunted across the regulated voltage output leads 158 and 160. A resistor 176 limits the surge current through the regulator 140.

A sensitive, quick acting, preferably reed type relay having an operating coil 168 and a normally open switch 170 constitute the component to be ultimately controlled internally of the module 16 itself by the functioning of the circuitry of the latter, but it will be noted that the reed relay switch 170 in turn controls the energization of the operating coil 78 or the main power relay of the unit 14 in such manner that the operating coil 78 will be energized to close its main power circuit completing relay switches 80, 82 and 84 only when the operating coil 168 of the reed relay is energized to close its switch 170. The regulated positive voltage lead 158 is coupled with one side of the reed relay operating coil 168 via a lead 167, while the opposite side of the coil 168 is connected to a lead 169 "heading toward" ground (but the flow of current to which is controlled as hereinafter explained).

A resistance measuring bridge may next be identified having its "top" at the regulated positive voltage lead 158, a "left mid-point" at 172, a "right mid-point" at 174, and its "bottom" at the negative or ground lead 150, in which the "left upper" arm is presented by a resistance 176 coupled between the positive lead 158 and the "mid-point" 172, the "left lower" arm is presented by the reference resistance 40 at the remote working unit 10 which is coupled between the "mid-point" 172 and ground lead 150 via a lead 178, a fuse 180 (for protection of the module 16 in the event of shorting of a power conductor of the cable 12 to the pilot conductor 46 thereof), a lead 182, the terminal B, the pilot and grounding conductors 46 and 30 of the cable 12, and terminal A; the "upper right" arm is presented by resistances 184 and 186 coupled in series between the positive lead 158 and the mid-point 174; and the lower right arm is presented by the manually variable resistance 188 which is coupled between the mid-point 174 and the negative or ground lead 150. It may be noted that the upper right arm is provided with an intermediate connection point 190 between the resistances 184 and 186 for purposes hereinafter explained. In the preferred embodiment, suitable values are about 30 ohms for resistance 176, about 143,000 ohms for resistance 184, about 7,000 ohms for resistance 186, and a range of about 0 to 50 K ohms for variable resistance 188; a value of about 4 ohms for resistance 40, plus about 1 ohm more in the conductors 30 and 46 of the cable 12 give an effective resistance for the lower left, remote arm of the bridge of about 5 ohms. A capacitor 192 of, say 8.2 mfd, is coupled between the intermediate connection point 190 of the bridge and the "bottom" of the latter represented by the negative or ground lead 150, the purpose of such capacitor being to dynamically balance the bridge circuit so that any small fluctuation in the regulated supply voltage (such as may occur during start up of the motor 22 of a large machine unit 10) will not cause a false fault condition to be sensed by the bridge. The condition of balance or imbalance of the bridge, which is most significantly dependent upon the integrity of the sensing path to the unit 10 through the pilot conductor 46, through the reference 40 at the unit 10 and back to the ground lead 150 of the module 16 via the grounding conductor 30, is measured relative to the ground lead 150 from both the right mid-point 174 and the intermediate connection point 190 simultaneously and as separate voltages available for use in the potential comparing functions hereinafter described. Thus, those skilled in the art will perceive that the type of measuring bridge arrangement presented by the above mentioned components and connections provide a basis for establishing a fault sensing "window", with respect to which an imbalance of the potential at point 172 in either direction outside of the window or range selected for permitting normal operation of the system will result in an immediate and valid fault detection by which the reed relay switch 170 may be controlled in the manner hereinafter described. Before leaving consideration of the components associated with the measuring bridge portion of the apparatus, it should be noted that a resistance-capacitance filter for eliminating the adverse effects upon the bridge of alternating current transients is employed and involves a series pair of resistances 194 and 196 coupled with the left mid-point 172 (which is in turn coupled with the pilot conductor 46), a pair of capacitors 198 and 200 respectively shunted from the ends of the resistances 194 and 196 remote from the mid-point 172 to the ground lead 150 and a capacitor 201 coupled with the non-invert sensing lead 206 hereinafter further identified. This filter arrangement is particularly effective in eliminating transients being returned to the module 16 via the pilot and ground conductors 46 and 30 in order to exclude from one of the inputs to the voltage comparator stages hereinafter described those alternating current transients that are likely to occur at the operating frequency of the main power source 58 involved in the system and at harmonics and sub-harmonics thereof.

For utilizing the continuing voltage level measurements being derived from points 174 and 190 of the measuring bridge, in terms of their respective relationships to the voltage level sensed at the left mid-point 172 of the bridge, a pair of voltage comparator stages are employed. Each of such stages uses an operational amplifier operating in voltage comparing mode, such comparators being respectively designated 202 and 204 in FIG. 2. Although various types of operational amplifiers could be selected, the preferred embodiment satisfactorily employs type 741 op amps made and distributed by Fairchild Semiconductor Products Company. In each of the op amps 202 and 204 the output terminal conventionally appears at the right extremity of the op amp symbol in FIG. 2, and the other terminals thereof are identified by small numerals within the symbol as follows: terminal 2 is the non-invert input terminal, terminal 3 is the invert input terminal, terminal 4 is the negative or ground terminal, and terminal 7 is the positive voltage supply terminal, it being noted both that such terminal reference numerals will not necessarily correspond to those specified by the manufacturers for other types of operationally equivalent op amps and that many commercially available op amp components will have additional terminals intended for other purposes and which are not needed or used in the apparatus of this invention.

The non-invert input for the comparator 202 is the measured voltage level derived from the interconnection point 190 of the measuring bridge via a lead 206. The invert input for the comparator 202 is derived from the left mid-point 172 of the bridge via resistance 194, lead 208, resistance 196 and leads 210 and 212. The op amp 202 obtains its negative supply connection from a negative lead 151 and terminal C, and the required positive operating voltage for the comparator 202 is obtained from the positive regulated lead 158 via a connecting lead 216. The output from the comparator 202 presented at its output lead 218, which responds to the voltage differential between the non-invert and invert inputs between the voltage levels applied to the comparator 202 from leads 206 and 212 respectively and may vary from essentially 0 to about 24 volts with a 24 volt regulated supply (operated from typically 32 volts input to the regulator 140), branches into two paths represented by the leads 220 and 222. The path began by the lead 220 is the main output path to be used for control purposes as hereinafter described. The branch path began by the lead 222, however, is a negative feedback path to the non-invert input of the comparator 222, which is traceable from lead 222 through a filter comprising a parallelled resistance 224 and capacitance 226 and a lead 228 connected to the lead 206 running to the non-invert terminal of the comparator 202. Such negative feedback through the filter 224-226 provides further suppression of the adverse effects upon the reliability of fault detection that would otherwise tend to result from alternating current transients carried to the module 16 from the cable means 12, it being noted that special attention in such respect must be paid to transients occurring at the main power frequency or harmonics or sub-harmonics thereof. The values used in the preferred embodiment of the module 16 for employment in connection with a 60 cycle primary power frequency are: 4.7 megohms for the resistance 224 and 0.015 mfd for the capacitance 226. It may similarly be noted that satisfactory values for the components of the filter 194, 196, 198, 200 have been found to be: 20,000 ohms for the resistance 194, 10,000 ohms for the resistance 196, and 4.3 mfd for each of the capacitances 198, 200 and 201. With the mentioned negative feedback and filtering, the output of the comparator 202 delivered to the main control signal output therefrom is essentially insensitive to all of the types of transients normally encountered in the types of system under consideration and constitutes a direct current electrical potential closely and immediately following any changes in the potential differential applied to the non-invert and invert inputs of the comparator 202 from the intermediate connection point 190 and the left mid-point 172 of the measuring bridge.

In similar fashion, the comparator 204 derives its non-invert input from the right mid-point 174 of the measuring bridge via lead 230 and its invert input from the left mid-point 172 of the measuring bridge via the same circuit traced for the comparator 202 plus the lead 232. The comparator 204 is connected to the negative lead 151 by a lead 234 and is connected to the regulated positive supply potential line 158 via a lead 236. The output lead 238 from the comparator 204 splits into a main control branch lead 240 and a negative feedback lead 242, the latter of which leads to the non-invert input lead 230 through a parallel R-C filter employing a resistance 242 and a capacitance 244. Again, the direct current potential presented on output branch lead 240 from the comparator 204 faithfully and immediately reflects any changes in the potential difference between the non-invert and invert inputs to the comparator 204 from the right mid-point 174 and the left mid-point 172 respectively of the measuring bridge.

The remaining primary components of the module 16 are a pair of Photo-Darlington switching amplifiers 246 and 248 (which may suitably be of type MCA2-30 made and marketed by the semi-conductor division of Monsanto Chemical Company). Each of the amplifiers is essntially employed as an electronically controlled switch and conventionally includes a photo emitting diode 250 (or 252) which radiates when conducting, a photo sensitive transistor 254 (or 256) which conducts in response to radiation from the diode 250 (or 252), and a switching transistor 258 (or 260) directly coupled in the usual manner to the transistor 254 (or 256) which conducts between its collector and emitter only when the diode 250 (or 252) is radiating. The collector to emitter structures of the transistors 258 and 260 are coupled in series with each other and with the circuit for controlling energization of the reed relay operating coil 168 through a path traceable from the regulated positive supply lead 158 through lead 167, coil 168, lead 169, transistor 258 of amplifier switch 246, a lead 262, transistor 260, and a lead 264 to the ground extension lead 150'. As will be apparent, the coil 168 will be energized to close the reed relay switch 170, and thereby energize the coil 78 (FIG. 1) for closing the main power relay switches 80, 82 and 84, only when both of the transistors 258 and 260 are conducting, which in turn will occur only when both of the diodes 250 and 252 are conducting. Thus, a cessation of conduction by either of the diodes 250 or 252 from any cause, including either fault detection in connection with the main power distribution system or a local electrical failure such as loss of operating power within the control module 16 itself, will result in immediate deenergization of the main power distribution system by the deenergization of the relay coil 78 and opening of the main power switches 80, 82 and 84. It is significant that, with the improved apparatus of this invention, such protective action is normally effectuated within about the duration of a single cycle of the main 60 cycle power source current following the occurrence of the fault precipitating such action.

From the structural viewpoint, it remains only to identify the paths through which control over conduction of the diodes 250 and 252 is accomplished in response to the outputs from the comparators 202 and 204. As to the comparator 202, and assuming a positive to negative current flow convention for convenience of description, such path proceeds from the regulated positive supply lead 158 through a lead 266, the diode 252 of amplifier-switch 248, a lead 268, a light emitting diode 270 (which provides the indicator 96 identified on the panel 94 in FIG. 1), a lead 272, a diode 274 provided merely to protect the more delicate photo diode 252 against possible reverse transients, a lead 276, and a current limiting resistance 278 to the control output branch lead 220 of the comparator 202. Similarly, for the comparator 204, and with the same convention, the path may be traced from the control output branch lead 240 of the comparator 204 through a current limiting resistance 280, a lead 282, the photo diode 250 of amplifier-switch 246, a lead 284, a light emitting diode 286 (which provides the indicator 98 on panel 94) a lead 288, a diode 290 for protecting against possible reverse transients, and a lead 292 to the ground extension lead 150'.

Attention may now be turned to the manner in which the circuitry of the module 16 operates to accomplish the desired control of the coil 168 and switch 170 of the reed relay in response to the measurements made by the above described bridge, which senses the resistance presented between the left mid-point 172 (or pilot conductor 46) and the bottom of the bridge at ground lead 150 (or grounding conductor 30) in terms of the relationships between the potential sensed at the left mid-point 172 of the bridge in relation to the voltage levels sensed at each of the intermediate connection point 190 and the left mid-point 174 of the bridge. It should be apparent, therefore, that the aggregate resistance of the remote reference resistance 40, plus the relative nominal additional series resistance in the pilot conductor 46 and the grounding conductor 30, or more accurately the proportional relationship thereof to the selected value of the upper left bridge arm resistance 176, is being compared with, first, the proportionate part of the entire resistance of the right side of the bridge (including resistance 184, 186 and 188) that is represented by the aggregate values of the resistances 186 and 188 interposed between the connection point 190 and the ground lead 150 and secondly, the proportionate part of the entire resistance of the entire right side of the bridge that is represented by the variable resistance 188 only interposed between the right mid-point 174 and the ground lead 150. It should be further understood that the resistance 186 or, equivalently, the difference in potential levels sensed at points 190 and 174 of the right side of the bridge represent the window or range of the variation of the remote resistance 46, 40, 30 or, equivalently, the voltage sensed at the left mid-point 172 of the bridge which will be considered normal and as confirming the absence of an external fault. The width of such window or range of variation treated as normal should preferably be of the order of only 2 or 3 ohms of variation of the remote resistance 46, 40, 30. The width of such window is established by the choice of resistance values of the resistances in the various fixed arms of the bridge and particularly by the relationship between the resistances 186, 184 and the resistance value to which the resistance 188 is adjusted. With the valued of the bridge resistances being those previously noted as employed in the preferred embodiment, the variable resistance 188 will normally be set by the knob 100 to about half of its maximum value or approximately 25,000 ohms. In relationship to the resistance values of the other bridge arms, however, such a setting corresponds to a lower limit for the window of about 5 ohms for the remote resistance 46, 40, 30 (which setting may be appropriately altered, however, by adjustment of the variable resistance 188 to accommodate different types of cable means 12 than the one assumed for illustrative purposes to present only about 1 ohm of additional resistance in the conductors 46 and 30 to be added to the resistance of the remote reference resistance 40 itself).

It will next be observed that the output from the comparator 202 is essentially 0 or at ground level whenever the voltage level applied to the non-invert input thereof from the intermediate connection point 190 is more positive than the voltage level applied to the invert input thereof from the left mid-point 172. With such 0 or low level output from the comparator 202 applied via the path previously traced to the side of the photo diode 252 of the switch 248 opposite from the side of such diode to which the regulated positive supply potential is applied, the photo diode 252 conducts and emits radiations ultimately causing the transistor 260 to also conduct in the manner previously described thereby "closing" switch 248. This condition essentially represents a sensing that the remote resistance 46, 40, 30 does not exceed the top limit of the normal operating window primarily selected by the resistances 186, 184 and 188. On the other hand, if the voltage level applied to the non-invert input of the comparator 202 from the connection point 190 should be less positive than the voltage level applied to the invert input thereof from the left mid-point 172, which would indicate that the remote resistance 46, 40, 30 had exceeded the upper limit of the window, then the output from the comparator 202 rises to a normally substantial positive value sufficient to prevent the photo diode 252 from continuing to conduct and radiate sufficiently to sufficiently the transistor 260 in its conductive state, thereby opening the switch 248.

The operation of the second comparator 204 is generally analogous, but with what might be called a polarity reversal in terms of the ultimate effect of its output upon the photo diode 250, which it will be noted has its side opposite to that receiving such output connected with the negative or ground potential of the module 16, rather than with the positive potential thereof that was comparably applied to the photo diode 252. Thus, the photo diode 250 conducts and radiates sufficiently to maintain conduction of the transistor 258, and thereby closing of the switch 246 when the output from the comparator is at a positive value materially above ground level. Such condition occurs when the voltage level sensed from the right mid-point 174 of the bridge and applied to the non-invert input of the comparator 204 is less positive than the voltage level sensed from the left mid-point 172 of the bridge and applied to the invert input of the comparator 204, it being understood that such condition therefore further corresponds to a sensing that the unknown resistance 46, 40, 30 equals or exceeds the lower limit of the window. The other condition for the comparator 204 and the photo diode 250 occurs when the non-invert input from point 174 becomes more positive than the level of the invert input from the point 172, which corresponds to a sensing that the remote resistance 46, 40, 30 has fallen below the lower limit of the window, which produces at the output of the comparator 204 a potential of low or essentially ground level that causes the photo diode 250 to cease to conduct and radiate sufficiently to maintain the transistor 258 in its conductive condition, thereby opening the switch 246.

It will now be further apparent that, since both of the switches 246 and 246 must remain simultaneously closed in order for the operating coil 168 of the reed relay to remain energized, the occurrence of any fault condition causing the module 16 to sense a variance in the remote resistance 46, 40, 30 outside of the relatively narrow window of 2 or 3 ohms will result in immediate deenergization of the coil 168, opening of the reed relay switch 170 and resultant opening of the main power relay switches 80, 82 and 84, regardless of the direction in which the sensing of the remote resistance 46, 40, 30 may depart from the narrow, permitted window range.

To further illustrate the operation of the module 16 in response to faults occurring at the external system level, consider as a first example any case wherein either the pilot conductor 46 or the ground conductor 30 of the cable means 12 is broken or cut between the unit 10 and the unit 14. In such case, the left mid-point 172 of the bridge is essentially rendered in a "floating" condition, since its coupling with the grounded bottom of the bridge through what normally constitutes the lower left arm of the bridge has been severed, which immediately results in the voltage level sensed at the point 172 and being applied to the invert inputs of both of the comparators 202 and 204 rising substantially to the positive supply level. This in turn results in the invert inputs from the point 172 becoming more positive than the non-invert input for the comparator 202 sensed from the connection point 190, which as previously noted results in a substantial positive level of output from the comparator 202 which renders the photo diode 252 non-conductive and opens the switch 248, thereby cutting off distribution of the high voltage main power in the system. The same result occurs in substantially the same way, in the event of failure to properly effect the grounding connection 32 to the frame 18 of the unit 10, from whence the "ground side" connection with the reference resistance 40 is derived through the lead 42.

Secondly, consider a fault condition in which the pilot conductor 46 becomes shorted to the grounding conductor 30 (either within the cable 12 or at a plug connecting point for the latter, thereby shunting the normal resistance of the cable conductors 46 and 30 only across the reference resistance 40. This condition would present a lower left bridge arm of very low resistance normally of the order of 1 ohm, thereby reducing the potential at the left mid-point 172 of the bridge to a very low positive value below the voltage levels at either connection point 190 or the mid-point 174 on the right side of the bridge. In this condition wherein the remote resistance sensed to exist between the pilot conductor 46 and the grounding conductor 30 falls below the lower limit of the window, it will be clear that the non-invert voltage input to the comparator 204 from the point 174 is more positive than the invert input to the comparator 204 from the point 172, which results in the output of the comparator 204 immediately falling to a low or essentially ground level, thereby causing the photo diode 250 to cease to conduct and the switch 246 to open. In the great majority of cases, when the cable means 12 is damaged, one or the other of the above noted conditions affecting the remote resistance 46, 40, 30 in manner to alter the latter outside of the normal operating window will occur and result in fault sensing and protective action by the module 16 in one of the ways above noted.

A short fault between a power conductor and the pilot conductor 46 causes the quick acting fuse 180 in the path from the pilot conductor 46 to the left midpoint 172 of the bridge, it being understood that actuation of the fuse 180 would provide a bridge imbalance analogous to that occurring when the pilot conductor 46 is interrupted to produce a shutdown of the system in the manner previously described for such last mentioned condition.

It will be observed that the indicators 96 and 98 on the panel are actuated whenever the corresponding photo diodes 250 and 252 are conducting and the corresponding switches 246 and 248 are closed, as they will be under normal operating conditions. If the knob 100 which controls the variable resistance 188 is calibrated, however, in terms of the equivalent resistance of the remote resistance 46, 40, 30 (typically from 0 to 10 ohms), rather than in terms of the actual setting of the lumped resistance presented by the resistance 188, then an additional function may be derived from the indicator 96. Since the indicator 96 will be actuated only when the photo diode 250 is conducting, if during initial start up or a test period the knob 100 is rotated from a low resistance setting in the direction of increasing resistance of the resistance 188, the indicator 96 will blink on as the photo diode 250 commences to conduct, which will represent the actual resistance of the remote resistance 46, 40, 30 in terms of the calibrations on the knob 100 just as the remote resistance 46, 40, 30 enters the window from the lower limit of the latter. This feature has been found most advantageous in the preferred embodiment, since it permits checking the integrity of the pilot conductor 46, the ground conductor 30, the reference resistance 40 and the various connections to those elements prior to the application of energizing power to the cable 12.

Those skilled in the art will appreciate that a number of the constructional details of the preferred embodiment described for purposes of illustrating the invention could be modified or equivalents substituted without departing from the gist and essence of the invention. For example, although we prefer to employ the Photo-Darlington amplifier components for the switches 246 and 248 because of their sensitivity, reliability and quick acting nature, other electronic switching components adapted to respond to appropriate outputs from the comparators 202 and 204 could be substituted with perhaps some sacrifice in the mentioned advantages of the preferred embodiment. In any event, however, it should be understood that the invention is believed and intended to be construed as limited only by the fair scope of the claims that follow and mechanical equivalents thereof.

We claim:

1. Safety control apparatus for use with an electric system of the class having a power unit provided with means presenting a source of electrical power available for distribution, means providing an electrical ground at the power unit, a working unit spaced from and moveable relative to the power unit which requires electrical coupling with said ground for safety purposes and is provided with means requiring electrical power for operation thereof, cable means extending between said units and provided with a grounding conductor for coupling said ground with the working unit, a pilot conductor and power conductors for coupling said power source presenting means at the power unit with said power requiring means at the working unit, a resistance component coupled between the ends of said grounding and pilot conductors at the working unit, and electrically controllable power switching means at the power unit for interrupting the coupling of said power conductors to the power source presenting means, said apparatus including:
   a resistance measuring bridge circuit having a pair of opposed end-points, a pair of opposed mid-points, an arm between each end-point and each mid-point respectively, and means applying a direct current voltage across said end-points;
   a first resistance component coupled in the arm of the bridge circuit between one end-point and one mid-point thereof;
   means coupling the ends of said pilot and grounding conductors at the power unit with said one mid-point and the other end-point of said bridge circuit respectively;
   an intermediate connection point in the arm of said bridge circuit between said one end-point and the other mid-point thereof;
   a second resistance component coupled between said one end-point and said intermediate connection point and said other mid-point of said bridge circuit;
   a third resistance component coupled between said intermediate connection point and said other mid-point of said bridge circuit;
   a fourth resistance component coupled between said intermediate connection point and said other end-point of the bridge circuit;
   first voltage comparator means having a pair of input terminals and an output terminal and adapted to produce at said output terminal a comparison result output dependent upon the relationship between electrical potentials applied to said input terminals thereof;
   second voltage comparator means having a pair of input terminals and an output terminal and adapted to produce at said output terminal a comparison result output dependent upon the relationship between electrical potentials applied to said input terminals thereof;
   means electrically coupling said one mid-point of said bridge circuit with one input terminal of each of said comparator means;
   means electrically coupling said intermediate connection point of said bridge circuit with the other input terminal of said first comparator means;
   means electrically coupling said other mid-point of said bridge circuit with the other input terminal of said second comparator means; and
   control means operably coupled with said output terminals of said first and second comparator means and with said power switching means for controlling the latter in response to said comparison result outputs.

2. The invention of claim 1, wherein:
said fourth resistance component is of adjustably variable resistance level.

3. The invention of claim 1, wherein:
said control means is arranged for opening said power switching means whenever the electrical potential applied to said one input terminal of said comparator means from said one mid-point of said bridge circuit is either greater than the potential applied to said other input terminal of said first comparator means from said intermediate connection point of said bridge circuit or less than the potential applied to said other input terminal of said second comparator means from said other mid-point of said bridge circuit.

4. The invention of claim 3, wherein:
said control means includes a pair of Photo-Darlington circuits each provided with a control path and a switched path, means coupling said output terminal of each of said comparator means with the control path of a corresponding Photo-Darlington circuit, and a control output circuit having said switched paths of both of said Photo-Darlington circuits coupled in series therewith.

5. The invention of claim 4, wherein:
said control means further includes a control relay having an operating coil coupled in series with said control circuit.

* * * * *